(12) United States Patent
Westberg et al.

(10) Patent No.: US 6,215,298 B1
(45) Date of Patent: Apr. 10, 2001

(54) DUAL RANGE TACHOMETER

(75) Inventors: John V. Westberg, Kingston; Karl G. Rindt, Wonder Lake, both of IL (US); Timothy D. Joyce, Spanish Fork, UT (US)

(73) Assignee: Auto Meter Products, Inc., Sycamore, IL (US)

( * ) Notice: Subject to any disclaimer, the term of this patent is extended or adjusted under 35 U.S.C. 154(b) by 0 days.

(21) Appl. No.: 09/199,717

(22) Filed: Nov. 25, 1998

(51) Int. Cl.[7] .................. G01P 3/48; G01P 1/08; G01R 1/08; G01R 13/00; G01R 15/08
(52) U.S. Cl. .......... 324/166; 324/160; 324/115; 324/131; 702/145
(58) Field of Search ............... 324/160, 161, 324/166–171, 175, 114–116, 131, 132, 74; 73/488, 495, 866.3; 702/142, 145–148; 340/461, 466, 670, 671

(56) References Cited

U.S. PATENT DOCUMENTS

| | | | |
|---|---|---|---|
| 2,887,654 | * 5/1959 | Strassman et al. | 324/166 |
| 4,340,847 | * 7/1982 | Izumi | 324/772 X |
| 4,415,855 | * 11/1983 | Dubauskas | 324/114 |
| 4,470,011 | * 9/1984 | Masuda | 324/166 |
| 5,079,509 | * 1/1992 | Marsh | 324/114 X |
| 5,166,610 | * 11/1992 | Bezos et al. | 324/114 X |
| 5,696,704 | * 12/1997 | Semrau | 324/171 X |

* cited by examiner

Primary Examiner—Gerard R. Strecker
(74) Attorney, Agent, or Firm—Stephen G. Rudisill; Jenkens & Gilchrist (57) ABSTRACT

A tachometer has a display responsive to an rpm signal for producing an observable indication of an rpm value. A circuit responsive to an engine input develops a standard rpm signal representative of instantaneous engine rpm, and a differential Power Band amplifier circuit amplifies the difference between the standard rpm signal and an adjustable "offset" rpm signal by predetermined gain to produce an amplified differential rpm signal. A switching circuit selects the standard rpm signal or the amplified differential rpm Power Band signal for driving the display. A peak or valley rpm signal may also be developed and selected for display either in a standard mode or a differentially amplified Power Band mode.

50 Claims, 12 Drawing Sheets

DUAL RANGE TACHOMETER

FIELD OF THE INVENTION

This invention is directed generally to tachometers, and more particularly to a racing tachometer having two display modes in which two different ranges in two different sets of incremental values of engine speed in rpm are displayed.

BACKGROUND OF THE INVENTION

Automotive racing continues to be refined as the equipment and driving techniques advance toward optimum performance. In one class of racing, professional circle track racing, often, the automobile's engine performance is measured in the laboratory on a dynamo meter which measures the engines torque, speed and power characteristics. Particular engine characteristics, together with transmission design, rear-end ratios, tire parameters, suspension set-up, and other vehicle characteristics, together result in actual "on track" vehicle racing performance. While the optimum rpm for a given vehicle may be established in the laboratory, this optimum rpm value will obviously vary from one vehicle to the next.

In professional circle track racing, the peak vehicle performance for a given set of track conditions tends to fall within a narrow band of engine rpms, given the other vehicle components such as transmission, tires, suspension, etc. as noted above. This peak performance or optimum range of engine rpm can be established in the laboratory as also noted above. For example, a variation in engine rpm of only as much as 50 rpm while entering or exiting a corner could require a small gear change in the differential. Accordingly, it is important that a racing tachometer give an accurate reading of engine rpm in a form in which the driver can best ascertain and utilize the information.

During a race, the engine rpm is measured by vehicle instruments and displayed to the driver by the tachometer. A digital tachometer can be very precise and display engine rpm down to several places. However, with rapid, slight variations in engine rpm, it is difficult for the average driver to quickly read and interpret the rapidly changing display of the digital tachometer. Accordingly, an analog display of rpm information, that is an analog tachometer display, is generally preferred in racing.

In most analog tachometers, a pointer rotation of approximately 250 to 270 degrees is provided. The diameter of the tachometer face may vary; however, even with a relatively large diameter face of the tachometer, with the requirement that the reading go from 0 to approximately 10,000 rpm, usually the minimum usable scale division which can be marked on the face of the dial is approximately 100 rpm. Such a scale division would result in division markings approximately 120 inches apart on a 5 inch diameter tachometer dial face. However, in practice, for purposes of maintaining peak vehicle performance as mentioned above, often as little as 20 rpm variation in engine speed can be significant. Thus, with minimum usable divisions representing 100 rpm, a variation of 20 rpm is difficult or impossible to read or identify. Thus, it is difficult with present tachometers for the racing driver to determine small yet significant variations from the optimal or peak performance rpm.

As a related matter, the peak or maximum rpm on a vehicle generally occurs immediately prior to gear shifting. Drivers often train heavily on effective gear shifting. Not only should the driver shift quickly and cleanly, but the driver should also shift at the appropriate engine speeds to extract the maximum power and racing speed from the vehicle. In oval track racing it is unlikely that the driver would over-rev the engine in high gear, but it is possible that he may have over-reved while accelerating through the gears. This could cause damage to the valve train which will be important information for the crew chief. While various rpm memory devices have been provided in the past for recording and recalling peak engine rpm, one aspect of the present invention provides an improvement in a peak or valley rpm memory.

A present invention improves on the above-noted situation regarding tachometer readings in that it allows for two different operational modes. In a first mode, the tachometer functions as a traditional instrument providing analog engine rpm information in a relatively wide range, such as from 0 to 10,000 rpm as the vehicle accelerates to competitive racing speed. In a second or "Power Band" mode, after the vehicle reaches competitive racing speed, the dial operation is in effect expanded. For example, the first or "normal" tachometer mode might have major dial divisions in 1,000 rpm increments with minor dial divisions in 100 rpm increments. However, the "Power Band" mode might have a full meter range of only 1,000 rpm, such that each major division represents 100 rpm and each minor division is equivalent to 10 rpm. Thus, the driver can more accurately determine relatively small changes in rpm of the engine with the Power Band mode in effect, and therefore more accurately maintain near peak performance.

Moreover, the present invention makes possible the selection of a nominal peak performance rpm as a center value of the Power Band range. Thus, any peak performance rpm which has been established in a laboratory or elsewhere can be selected as the "Power Band" center value on the meter in the present invention. The Power Band range will then read positive or negative increments to either side of this peak performance center value.

OBJECTS OF THE INVENTION

It is a general object of this invention to provide a novel and improved racing tachometer which overcomes the above-noted problems of the prior art.

A related object is to provide a racing tachometer which has two display modes in which the marked divisions on the meter or dial face represent two different ranges, of engine speed, in different increments.

A related object is to provide a racing tachometer wherein a nominal peak performance rpm may be set in as a center value of a range of meter or dial face readings.

A related object is to provide a racing tachometer which includes an improved peak and/or "valley" rpm memory.

SUMMARY OF THE INVENTION

Briefly, and in accordance with the foregoing objects, a tachometer in accordance with the invention comprises a display responsive to an rpm signal for producing an observable indication of an rpm value, a circuit responsive to an engine input for developing an rpm signal representative of instantaneous engine rpm, and a differential amplifier circuit for amplifying the difference between said rpm signal and an adjustable or selectable "offset" rpm signal by a predetermined gain to produce an amplified differential rpm or "Power Band" signal, and a switching circuit for either engine rpm or said amplified differential rpm or "Power Band" signal for driving said display. A peak or valley rpm signal may also be developed and selected for display either in a standard mode or a differentially amplified Power Band mode.

DETAILED DESCRIPTION

While the invention is susceptible to various modifications and alternative forms, specific embodiments have been shown by way of example in the drawings and will be described in detail herein. However, it should be understood that the invention is not intended to be limited to the particular details disclosed. Rather, the invention is to cover all modifications, equivalents, and alternatives falling within the spirit and scope of the invention as defined by the appended claims.

Figure 1:
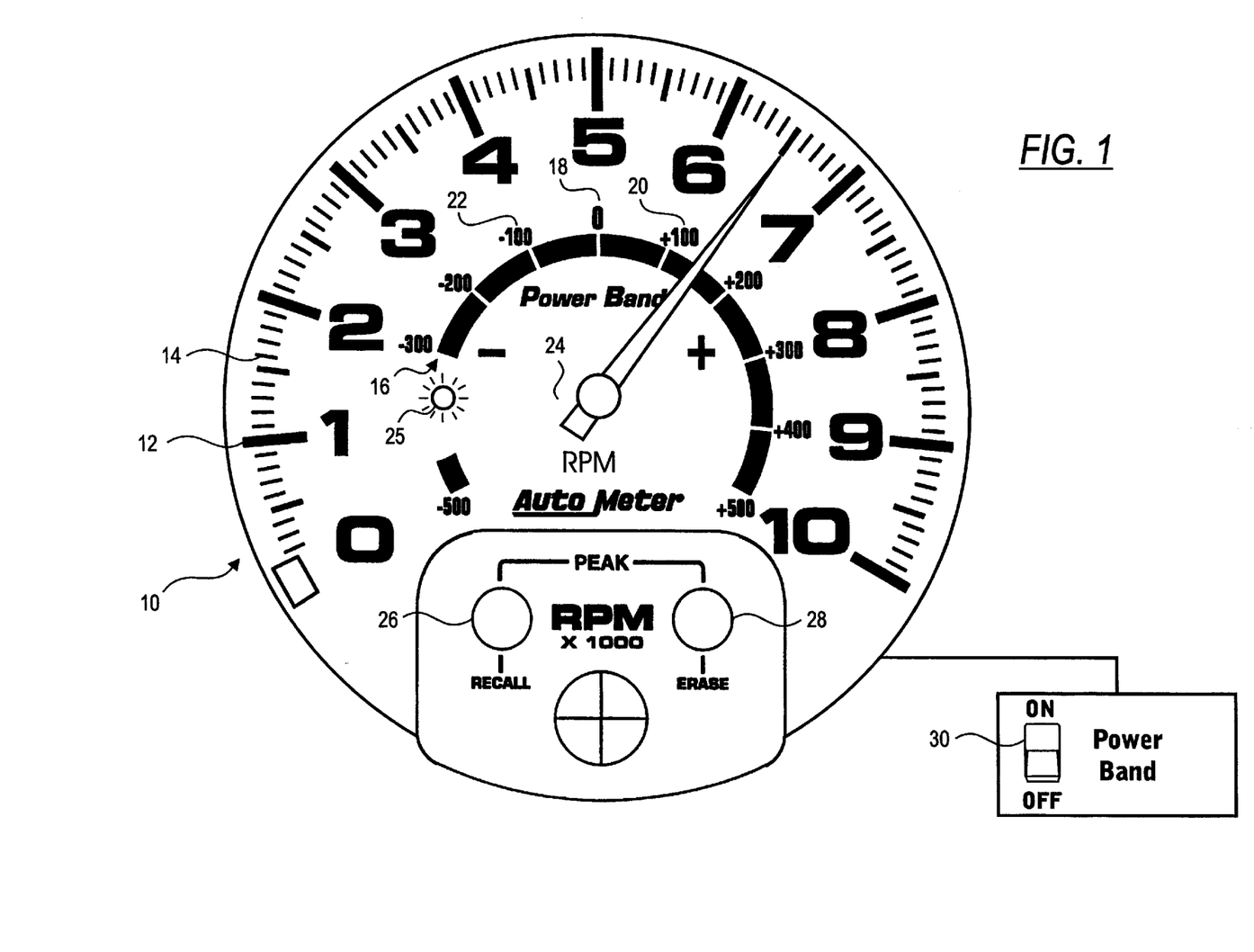
FIG. 1 shows a racing tachometer in accordance with the invention.

Referring now to the drawings, and initially to FIG. 1, there is illustrated the face or dial of a meter 10 in accordance with the invention. The meter face includes a plurality of major scale divisions 12 which are numbered 0–10 in the illustrated embodiment. Each of the major scale divisions is also divided into a number of minor scale divisions 14, there being 9 such divisions 14 within each major division 12. These divisions 12 and 14 are located about an outer circumference of the meter face. A second or "Power Band" set of meter divisions 16 is located on a second inner circumference of the meter face. The second group 16 of divisions defines a center or zero scale marking or point 18, a group of major divisions 20 labeled as +100, +200, etc. extending in a clockwise direction from the center or zero point 18 and a second group of major divisions 22 designated as -100, -200, etc. extending in a counterclockwise direction from the zero or center scale marking 18.

These "Power Band" divisions 16, 20 and 22 merely serve as a reference guide while the increment rpm readings in the "Power Band" mode are read on the outer scale divisions 12 and 14, in terms of rpm above or below the center point 18.

In normal operation, the outer major divisions 12 each represent an increment of 1,000 rpm, with the minor divisions 14 each representing an increment of 100 rpm. The pointer 24 in the illustration of FIG. 1 is pointing at the 6500 rpm mark of the dial. Thus, the outer markings 12 and 14 indicate engine speed and rpm during one mode of operation.

In accordance with the invention, a second or "Power Band" mode of meter operation is defined wherein the inner scale markings 16 are also utilized in connection with the pointer 24. In the Power Band mode, a selected optimum or "peak performance" rpm value is selected and is designated as the center or zero value, represented by the zero marking 18 of the scale 16. In the Power Band mode, the outer scale markings 12 and 14 are also used to determine increments of rpm, however, in this mode the major scale markings 12 each represent a 100 rpm increment and the minor scale markings 14 each represent a 10 rpm increment. Moreover, the inner scale markings 16 indicate in 100 rpm increments whether the engine rpm is above or below the designated optimum or peak performance rpm at the center point 18. These inner scale markings can be used as a reference together with the outer scale markings 14 to determine in 10 rpm increments the amount by which the current engine rpm exceeds or fall short of this optimum or peak performance value.

Accordingly, in the Power Band mode, the position of the pointer 24 relative to the markings 12, 14 and 16 will indicate in 100 rpm increments (with respect to markings 12 and 16) and 10 rpm increments (with respect to the markings 14) the amount by which the current engine rpm exceeds or falls short of the selected peak performance rpm value. A lamp or LED 25 may be illuminated to indicate when the meter 10 is operating in the "Power Band" mode. FIG. 1 also shows a recall switch 26 and an erase switch 28 for use in connection with a "peak" and/or "valley" rpm memory to be described below.

Summarizing, the tachometer of the invention allows for two operational modes. In the first mode, the tachometer functions to provide engine rpm information from 0–10,000 rpm (in the illustrated embodiment) as the vehicle accelerates to racing speed. However, in the Power Band mode, the meter of the invention operates in a second or expanded dial mode, herein referred to as the "Power Band" mode. This mode expands dial operation, such that the major dial divisions in this example are equal to 100 rpm and the minor dial divisions represent 10 rpm increments as explained above. Other applications are envisioned wherein a different differential amplifier gain and different scaled rpm divisions for the "Power Band" mode would be used. A Power Band on/off or "mode" switch 30 is provided for selecting the first or normal mode when the switch is in its "off" position and the second or Power Band mode when the switch is moved to its "on" position. In addition to manual switching by use of the switch 30, the invention contemplates that other methods of switching might be utilized without departing from the invention, such as an activation switch on a high gear linkage of the vehicle transmission, or an rpm threshold sensing circuit, or the like.

In accordance with another aspect of the invention, the value of the center point of the Power Band represented by the zero marking 18 of the scale 16 may be selected as desired to coincide with any desired rpm value, for example an optimum peak performance value as determined (such as by dynamo meter testing) for a particular vehicle. Thus, for example, the center point 18 of the dial in the Power Band mode may be selected to coincide with 7,200 rpm, such that in the Power Band mode, the meter dial will show readings of up to plus or minus 500 rpm from the center reading (i.e., from 6,700 to 7,700) rpm in 10 rpm increments of the minor dial markings 14. Thus, in this example, in the power band mode, the pointer 24 as shown in FIG. 1 now indicates 7200 rpm+150 rpm=7350 rpm.

Figure 2:
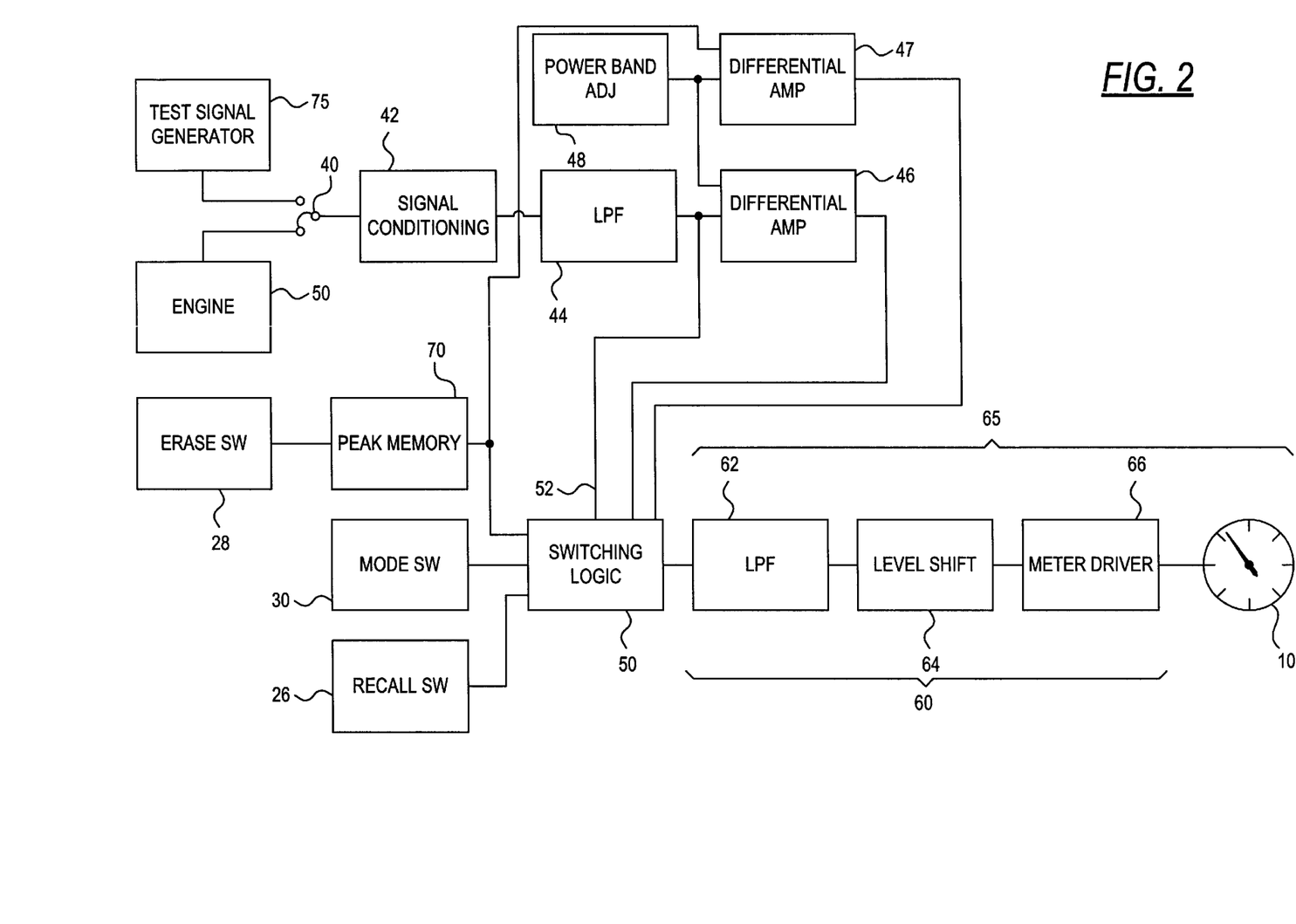
FIG. 2 is a functional block diagram of the circuitry for producing the tachometer display in accordance with the invention.

Referring now to FIG. 2, a functional block diagram of components for operating the meter 10 in the fashion described above, is illustrated. Initially, an engine speed input 40 receives an input or "frequency signal" from the engine 50 representative of engine rpm. This input is usually taken from the ignition system of the vehicle, such as from the distributor side of the coil. This "frequency signal" is converted by a signal conditioning circuit 42 into a pulse train which feeds into a low pass filter 44. The low pass filter 44 converts the signal to a voltage which corresponds to the actual or instantaneous vehicle rpm, and which is fed to one input of a differential amplifier circuit 46. A second input to the differential amplifier circuit comes from an adjustable "offset" rpm voltage signal from a Power Band adjust circuit 48.

The Power Band adjust circuit 48 outputs a voltage signal which is proportional to the selected "center" rpm (meter dial marking 18) in the Power Band mode, that is, the selected optimum or the peak performance rpm of the vehicle. The difference between the selected peak performance rpm and the actual rpm of the vehicle is amplified (by a factor of 10 in the illustrative embodiment) by the differential amplifier 46 and fed out to switching logic 50. The "actual" vehicle rpm voltage from the low pass filter is also fed to a second input 52 of the switching logic 50. The mode switch 30 determines which of these two signals is fed by the switching logic into meter drive circuitry 60. This meter drive circuitry 60 includes a low pass filter circuit 62, a level shifting circuit 64 and a meter driver component 66, which drives the meter 10. The meter 10 and circuitry 60 together comprise a "display portion" 65.

Figure 4A:
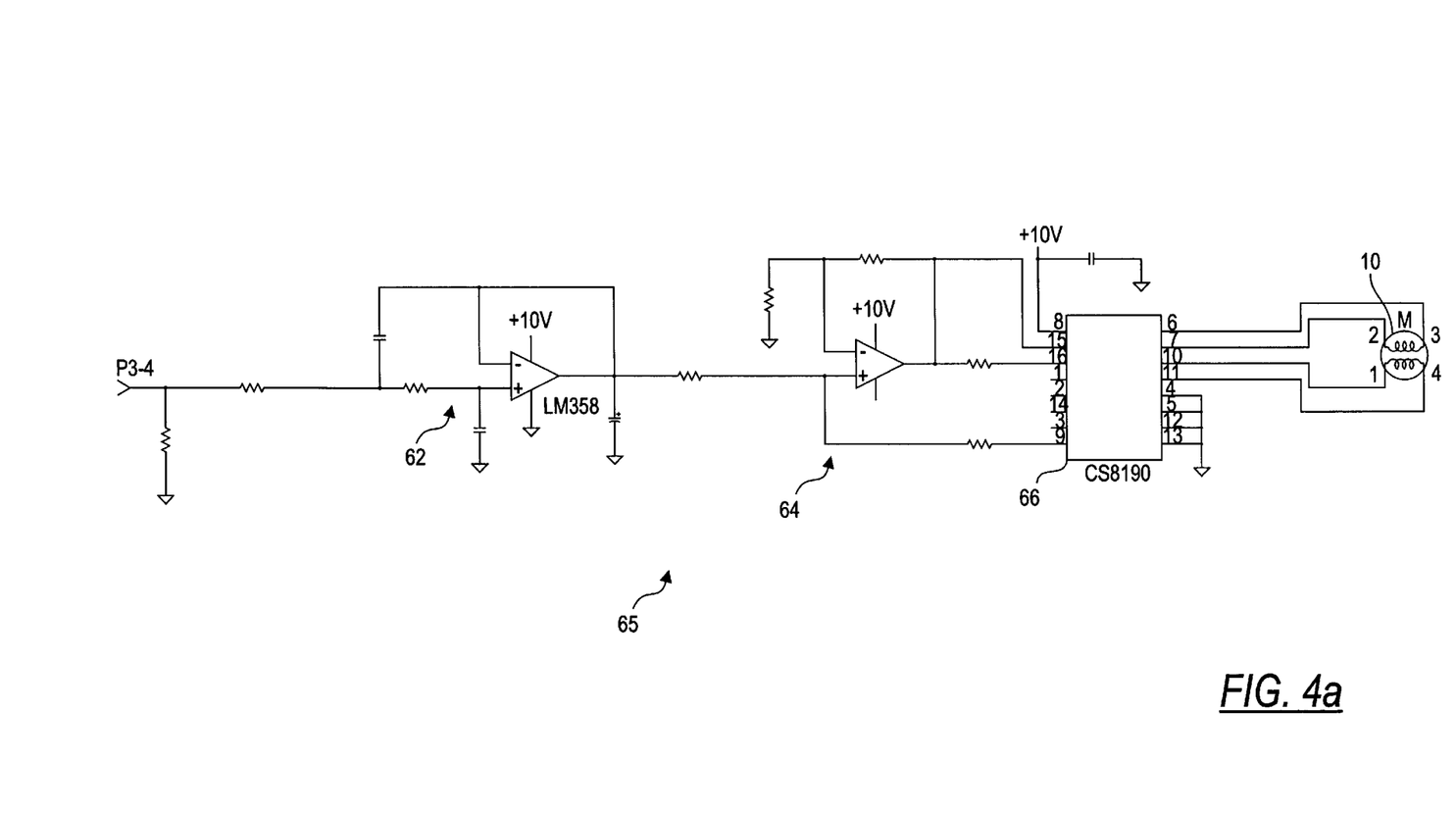
FIGS. 4a–4e form a schematic circuit diagram showing another portion of the circuitry of FIG. 2.
Figure 4B:
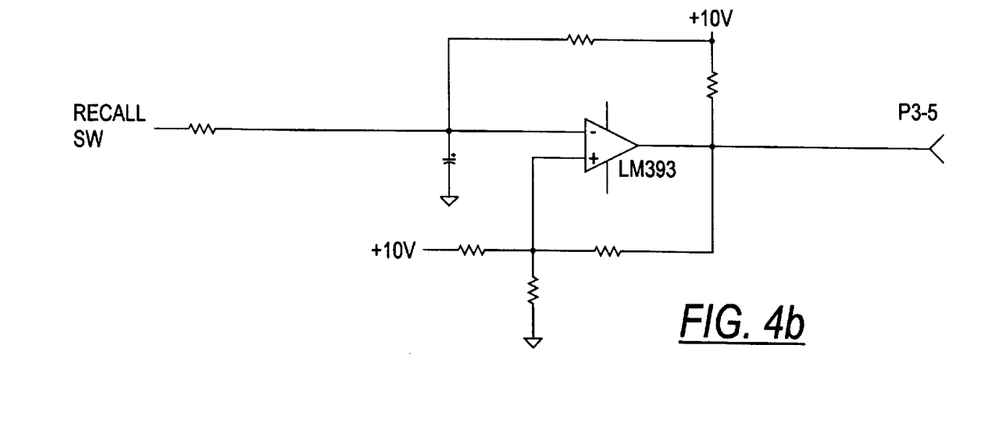

In accordance with one embodiment of the invention, the meter 10 may comprise an air core meter, such that the meter driver comprises an air core driver. The meter 10 may be one of the type made by Nu-Tech Engineering, Inc., while the meter driver 66 may be an air core driver of the type made by Cherry Semiconductor Corporation, 2000 South County Trail, East Greenwich, R.I. 02818-1530. Moreover, in the illustrated embodiment, as will be seen with reference to FIG. 4, the meter 10 comprises a differential air core meter, for example Nu-Tech MAC gauge No. 97020, also available as Auto Meter Part No. 3858-24-31, from Auto Meter Products, Inc., 413 W. Elm St., Sycamore, Ill. 60178, USA, while the driver 66 comprises a differential air core driver, for example Cherry Semiconductor Part No. CS8190. Other types of meters and meter drivers may be utilized without departing from the invention.

In accordance with a further, optional feature, a peak (and/or valley) rpm memory 70 may also be provided. This peak or valley rpm memory 70 receives, via the swithching logic 52, the voltage from the low pass filter 44 representative of engine rpm. The erase switch 28 may be used to erase the contents of the peak (and/or valley) rpm memory 70. The recall switch 26 is coupled with the switching logic 50, as is an output of the peak (and/or valley) rpm memory 70. Operation of the recall switch 26 will cause the switching logic 50 to display the contents of the peak (and/or valley) rpm memory on the meter 10 by way of the meter drive circuitry 60. Also, mode switch 30 permits selecting the peak (and/or valley) rpm memory rpm to be displayed in either the standard rpm mode or the "Power Band" mode. A second differential amplifier 47 is shown in FIG. 2 for this latter purpose. Detailed circuits for accomplishing this are not shown, but modifications or additions to the circuits illustrated to accomplish this will be readily apparent. For example, additional switching circuitry could be used to substitute the peak (and/or valley) signal for the engine rpm signal at the input to the differential amp 46 (rather than adding a second differential amp 47) so as to display the peak (and/or valley) signal in a "Power Band" mode, i.e. using the expanded meter scale.

In order to select the center rpm value (meter marking 18) in the Power Band mode, for example, such as an optimum or peak performance rpm for the particular vehicle, the input 40 may be uncoupled from the engine 50 and connected to a test signal generator 75. The test signal generator outputs a frequency signal which generally mimics the engine signal, and which may be set to a value representing the desired or peak performance or optimum rpm value. When the test signal generator has been set to this peak performance value, the Power Band adjust circuit 48 is adjusted (with the mode switch 30 in the Power Band "on" position) to a voltage value such that the meter pointer 24 points to the center marking 18 on the scale, which is also the same as the "5" marking of the outer circumference major scale divisions 12 in the meter face shown in FIG. 1. It is noted, however, that in the Power Band mode this value does not necessarily represent 5,000 rpm, but rather, may be any selected rpm value in accordance with the invention.

Referring now to FIGS. 3a–3e and 4a–4d, schematic circuit diagrams of one form of the circuits shown in FIG. 2 are illustrated. The portions of the circuits of FIGS. 3a–3e and 4a–4d which correspond to the various blocks in FIG. 2 have been indicated in FIGS. 3a–3e and 4a–4d by like reference numerals.

Figure 3A:
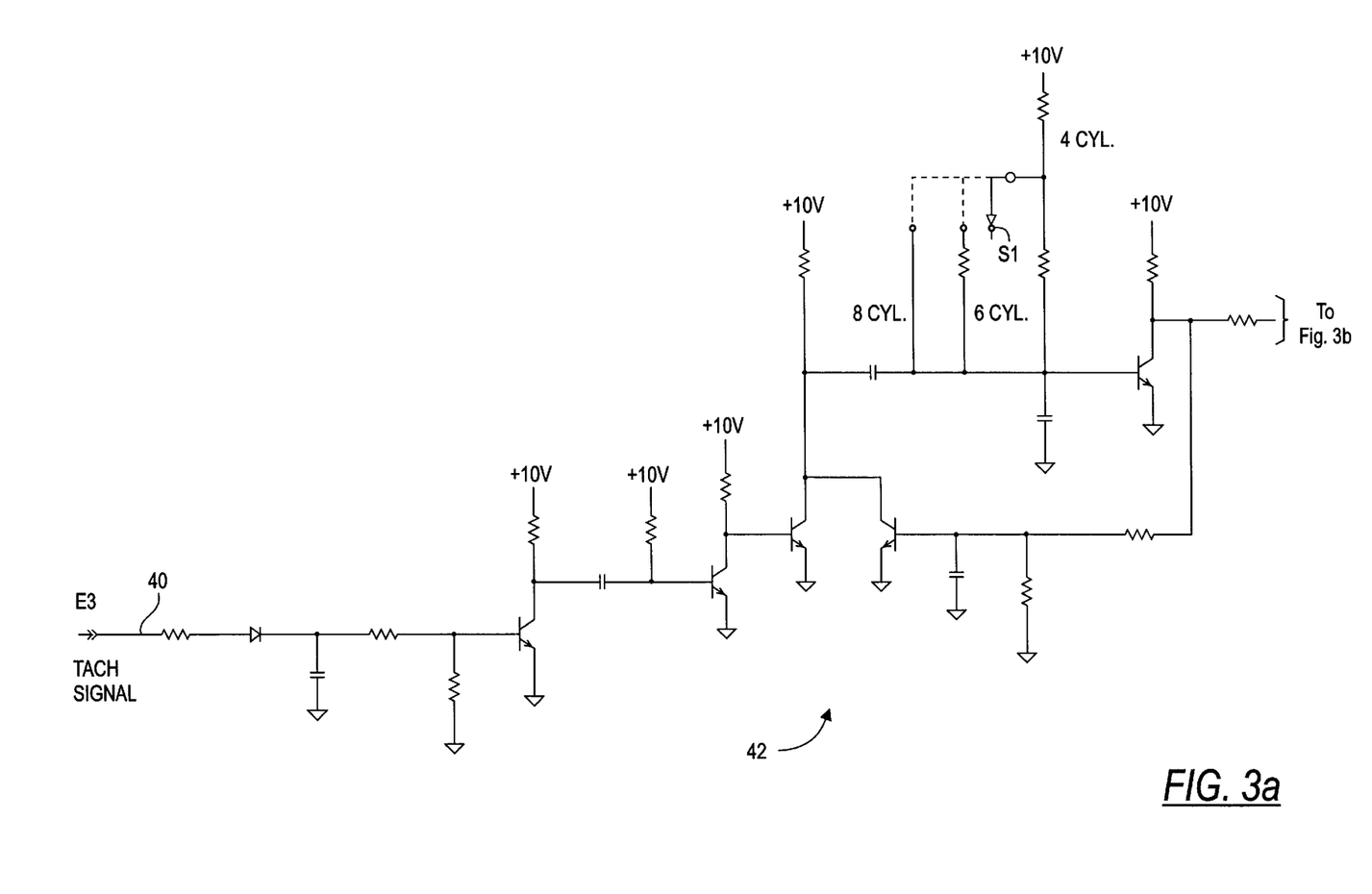
FIGS. 3a–3e form a schematic circuit diagram showing further details of a portion of the circuitry of FIG. 2.
Figure 3B:
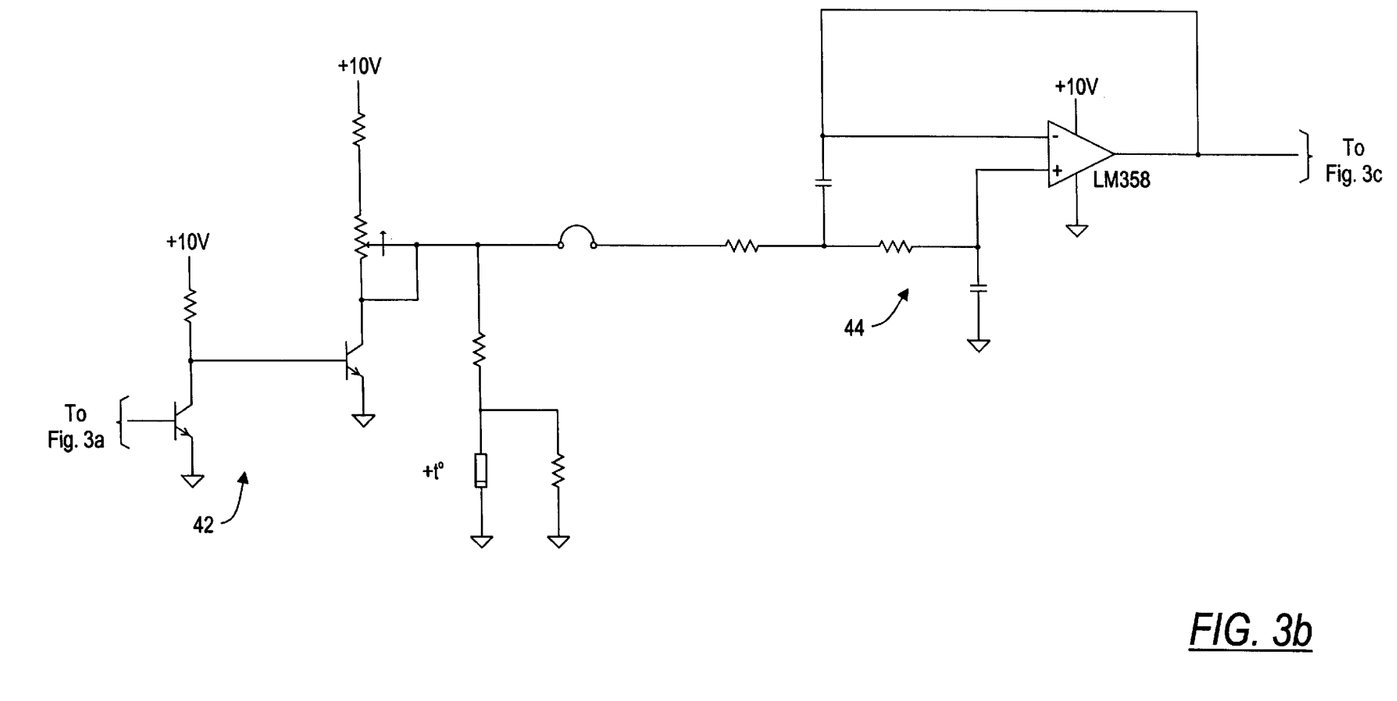
Figure 3C:
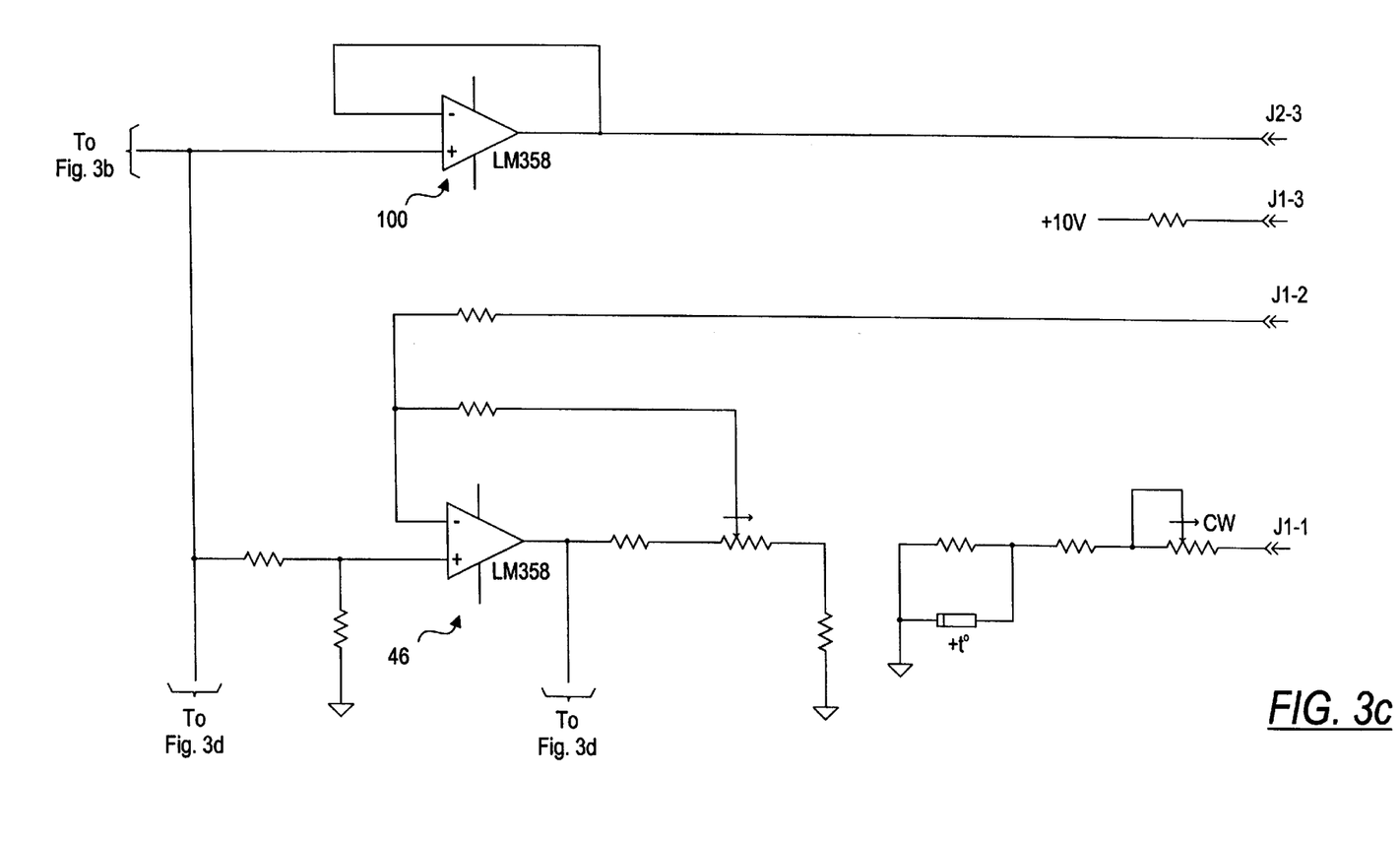
Figure 3D:
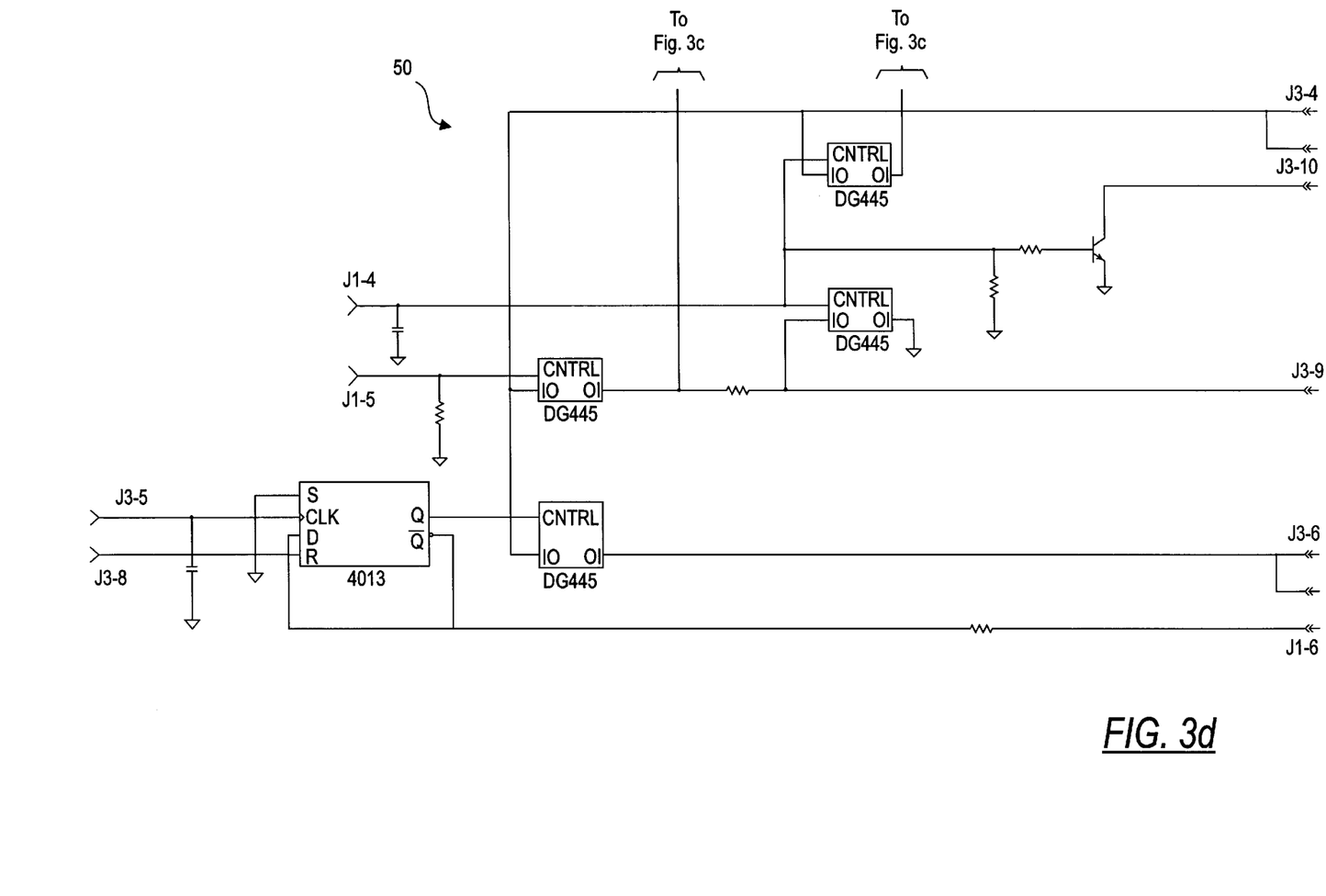
Figure 3E:
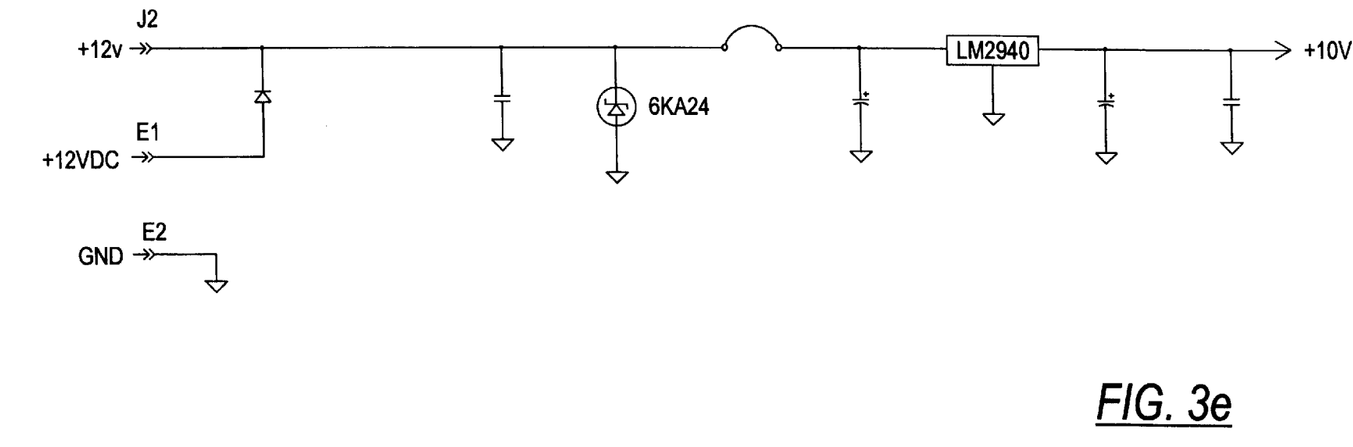
Figure 5:
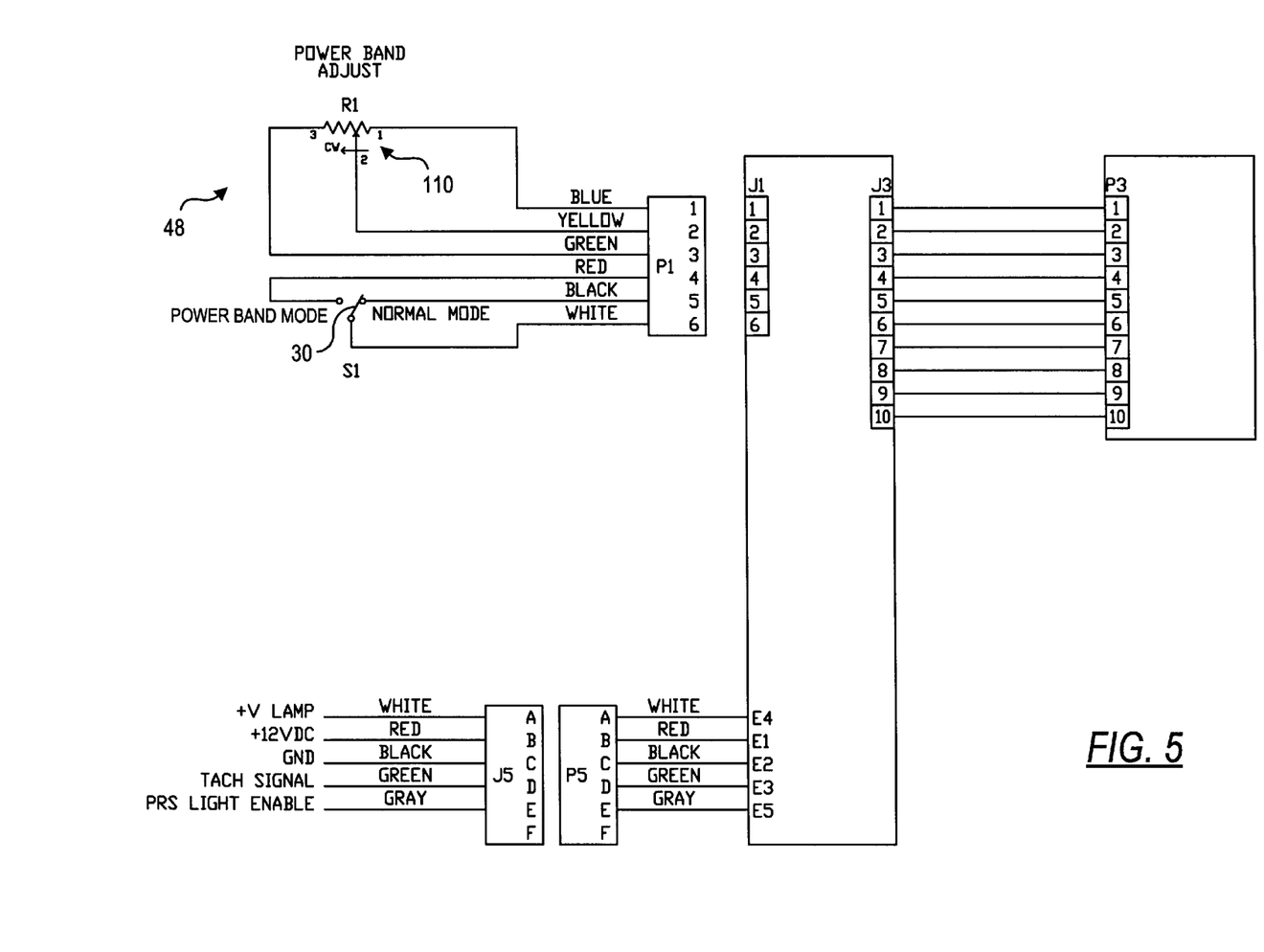
FIG. 5 is a wiring diagram showing an additional portion of the circuit of the invention and connections between the respective circuit portions.

Briefly, in FIG. 3a, the signal conditioning circuit 42 is built from discrete components, however, equivalent integrated circuit components could be used if desired. In FIG. 3b, the low pass filter 44 is a two pole active filter. In FIG. 3c, an additional buffer 100 provides a further "tach output" signal from the filter circuit 44, which may be used in connection with other equipment which is not a part of the present invention. The differential amplifier circuit 46 (FIG. 3c) and the analog switching circuit 50 (FIG. 3d) are assembled from integrated circuit components and discrete circuit components. The Power Band adjust circuit 48 comprises a potentiometer 110 which is shown in FIG. 5 and which is coupled at like-designated terminals to the circuit of FIGS. 3a–3e. The Power Band on/off switch 30 is also shown in schematic form in FIG. 5. FIG. 3e shows a DC power supply.

Referring briefly to FIG. 4a, the low pass filter 62 is a two-pole active filter circuit similar to the filter circuit 44 of FIG. 3b. The level shifting circuit 64 (FIG. 4a) feeds the differential air core driver, Cherry Semiconductor Part No. CS8190 or equivalent, which feeds the differential air core meter 10, such as Nu-Tech Part No. 97020 or equivalent, as indicated above.

Figure 4C:
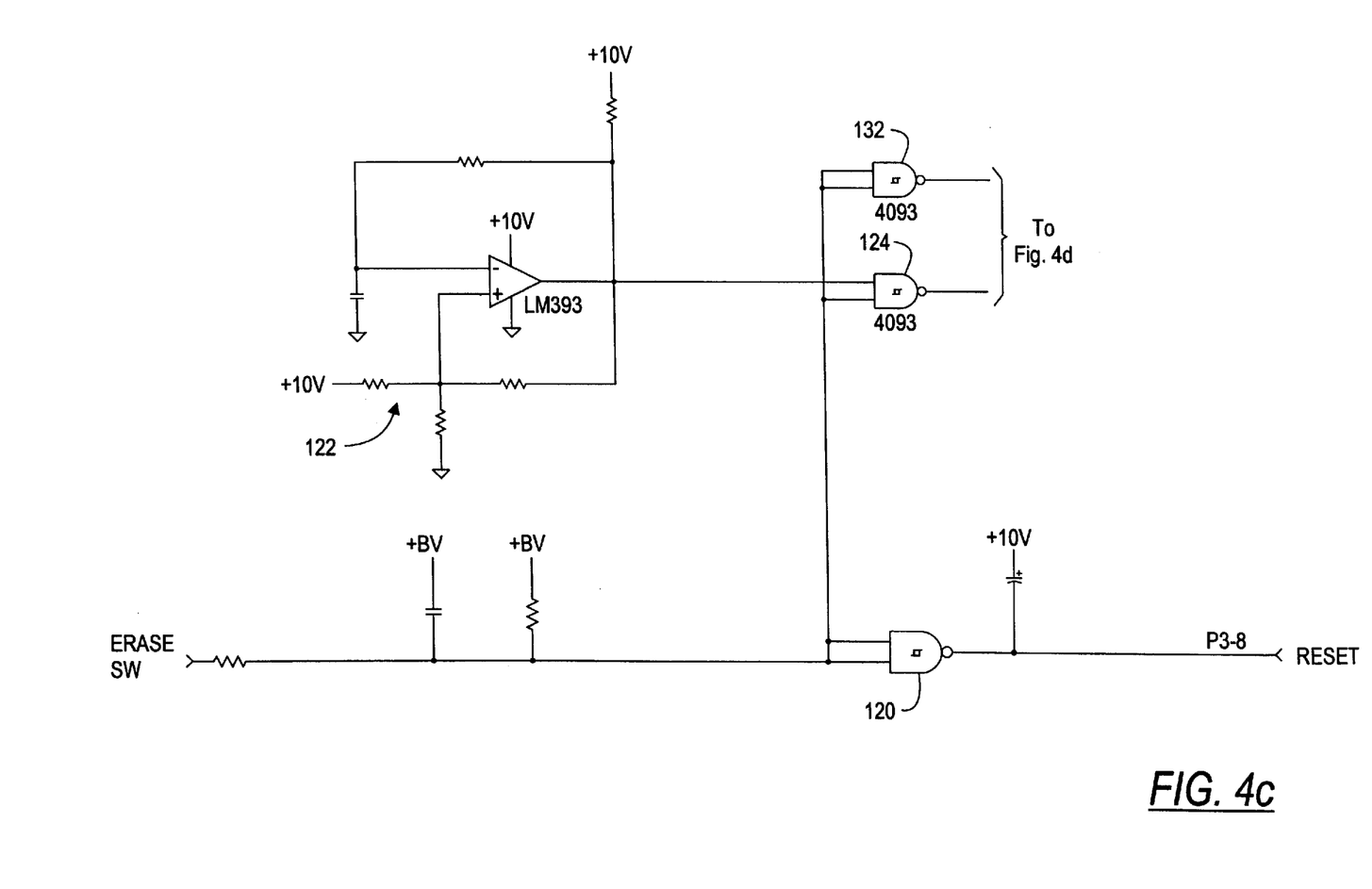
Figure 4D:
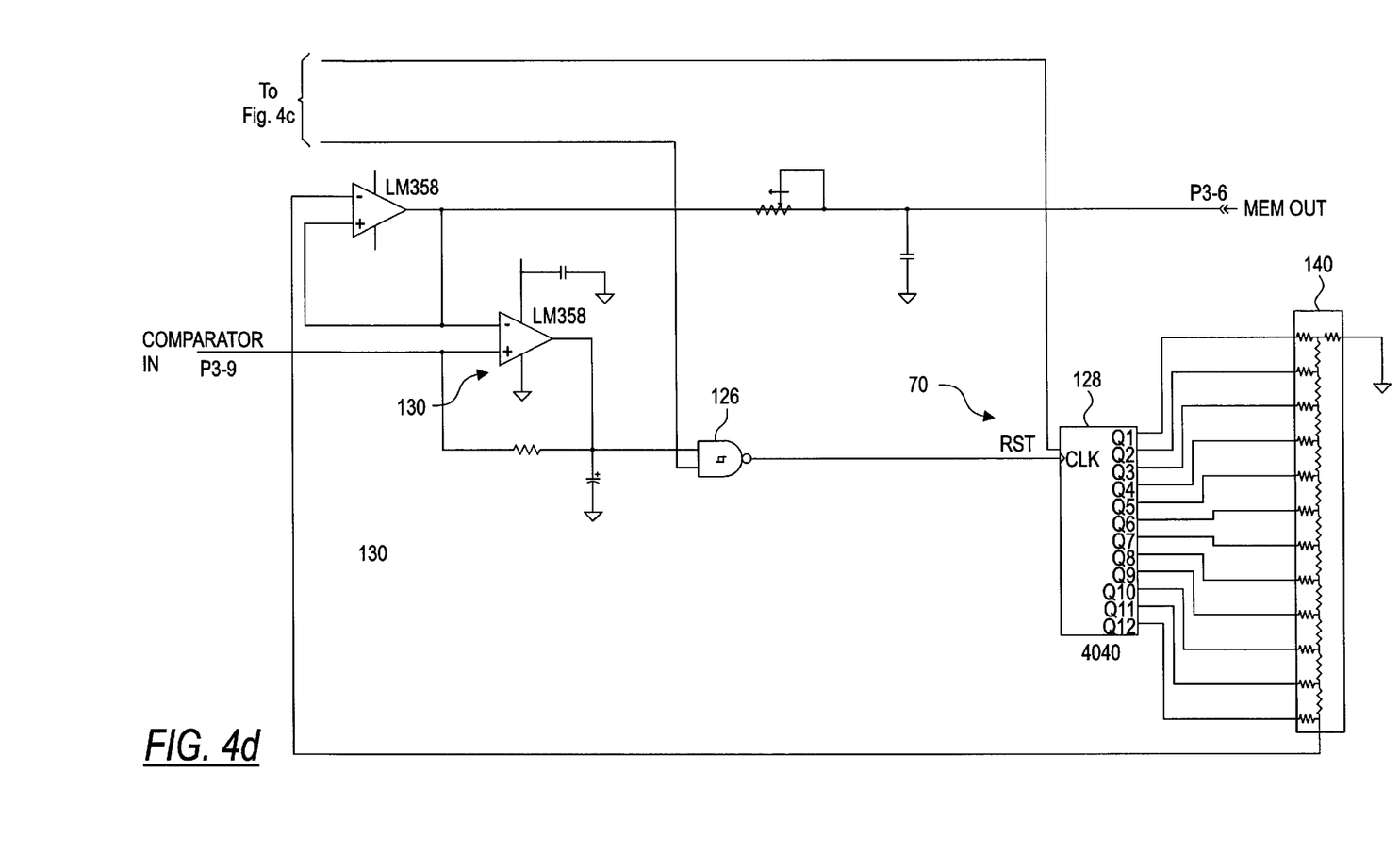

Some additional circuits in FIGS. 4c and 4d comprise a peak rpm memory circuit and associated components. A Schmitt trigger circuit 120 in FIG. 4c is coupled with the erase switch 28 to provide a pulse input in suitable form to the switching logic circuits 50 of FIG. 3d. A clock oscillator circuit 122 is gated by a clock gate 124 and a second gate 126 (FIG. 4d) to a twelve-bit binary ripple counter 128 which forms a memory portion of the peak memory circuit 70. A comparator 130 gates through the clock signal at gate 126 if the voltage at its positive input is higher than the voltage at its negative input. The voltage at the negative input is taken from a resistor network 140 which provides an analog voltage value corresponding to the rpm value currently at the counter 128, that is, the present peak rpm value. The voltage at the positive input comes from the filter circuit 44, and thus, as described above comprises a voltage which corresponds to the instantaneous engine rpm signal as processed by the circuits 42 and 44. Thus, if this instantaneous engine rpm voltage is higher than the peak rpm voltage in memory, the clock signal is gated through to allow the counter to continue to count up. The counter 128 can be reset by the erase switch 28 by way of an inverter 132 (FIG. 4c).

The resistor network 140 has its effective resistance value selected by the output of the counter 128. Thus, as the counter 128 counts up, the voltage at the output of the resistor network increases correspondingly. The provision of the 12-bit binary ripple counter and the resistors of the resistor network 140 provide a relatively large number of incremental voltages available to represent a correspondingly large number of incremental rpm values. Some other form of memory device, such as a latch, ROM, RAM, etc. may be utilized to determine or retain a peak or valley rpm value from the output of the counter without departing from the invention.

Figure 4E:
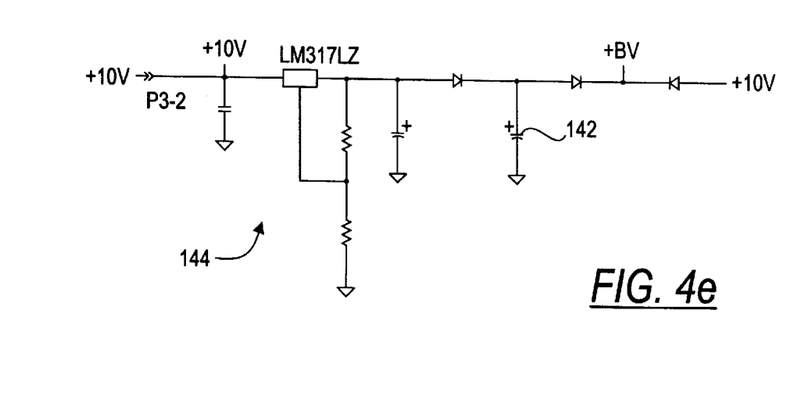

The value in the memory will be retained for so long as sufficient power is applied to the ripple counter to hold its output count. In order to prolong this period, during which the peak value is held in memory, for example during a power outage, a relatively large (e.g., one microfarad) capacitor 142 is provided in a voltage supply circuit 144 which supplies the counter 128, as shown in FIG. 4e. The peak rpm value from the resistor network 140 of the memory 70 is input to the switching logic 50 where it may be selected for display by operation of the memory recall switch 26 as described above.

While a "peak" memory is described in detail above, it will be appreciated that a "valley" memory for retaining a lowest or "valley" rpm value will be substantially similar in its construction and operation. Due to the nature of racing, the valley rpm memory feature would have a selectable "window-of-time" within which the valley rpm would be recorded. The driver could be provided with a button or switch to activate this "window."

What has been illustrated and described herein is a novel and improved racing tachometer which provides a first rpm range from 0–10,000 rpm in 1,000 rpm and 100 rpm marked increments, and a second or Power Band range in 100 rpm and 10 rpm marked increments using the same incremental markings of the meter dial. The Power Band range is presented as plus or minus deviations from a center or optimum or "peak performance" rpm value. This peak performance value may in turn be selected and set into the meter or changed, as desired. In accordance with an optional feature, the meter may also selectively display a peak or "valley" rpm value which is updated as peak rpm increases or as "valley" rpm decreases. This peak and/or "valley" rpm may be recalled and displayed in either the standard mode or the "Power Band" mode when desired and may also be erased so that new peak and "valley" rpms may be determined, updated, and recalled from time to time.

What is claimed is:

1. A tachometer comprising:
    a display responsive to an rpm signal for producing an observable indication of an rpm value;
    a circuit responsive to an engine input signal for developing an engine rpm signal representative of instantaneous engine rpm;
    a differential amplifier circuit for amplifying the difference between said engine rpm signal and an adjustable offset rpm signal corresponding to a selectable rpm value by a predetermined gain to produce an amplified differential rpm signal; and
    a switching circuit having a first state which selects said engine rpm signal for driving the display and a second state which selects said amplified differential rpm signal for driving said display.

2. The tachometer of claim 1 wherein said display comprises an analog meter including a moveable indicator and a plurality of scale markings.

3. The tachometer of claim 1 wherein said differential amplifier circuit has a first input for receiving said engine rpm signal and a second input for receiving an adjustable offset rpm signal and is responsive to the signals received at said first and second inputs for developing a differential output signal comprising a difference between the signals received at said first and second inputs amplified by said predetermined gain.

4. The tachometer of claim 2 wherein said scale markings represent first rpm increments in response to said engine rpm signal and second, smaller increments in response to said amplified differential rpm signal.

5. The tachometer of claim 3 wherein said display comprises an analog meter including a moveable indicator and a plurality of scale markings.

6. The tachometer of claim 5 wherein said scale markings represent first rpm increments in response to said engine rpm signal and second, smaller increments in response to said amplified differential rpm signal.

7. The tachometer of claim 3 and further including a signal adjustment circuit operatively coupled to said second input of said differential amplifier for adjusting the offset rpm signal so as to cause the display to produce an observable indication corresponding to a center value in response to a test signal corresponding to a desired rpm at the first input of said differential amplifier circuit, such that values of said engine rpm signal above and below said desired rpm will cause the display to produce an indication to either side of said center value.

8. The tachometer of claim 1 and further including a peak or valley rpm memory responsive to said engine rpm signal for continuously recording a peak or valley rpm value, and said switching circuit having a further state which selects said peak or valley rpm value for driving said display to provide an observable indication of said peak or valley rpm value.

9. The tachometer of claim 8 wherein said switching circuit further includes a state which substitutes said peak or valley signal for said engine input signal at said differential amplifier circuit and a state which selects said peak or valley rpm signal for said driving display and a state which selects an amplified differential peak or valley signal for driving said display.

10. The tachometer of claim 8 wherein said peak or vallev rpm memory comprises a memory device for retaining a signal corresponding to a peak or valley rpm value, a comparator for comparing the content of said memory device with said engine rpm signal and circuit means for causing said memory device to retain one of the greater or lesser of an instantaneous content of said memory device and an instantaneous value of the engine rpm signal.

11. The tachometer of claim 10 wherein said memory device comprises a binary counter and wherein said peak or valley rpm memory further includes a resistor network coupled with said counter for converting the digital output count of said counter to an analog value, and a clock for driving said counter in response to said comparator.

12. The tachometer of claim 10 wherein said peak rpm memory further comprises a resistor network coupled to said counter for selecting a resistance value corresponding to said output count.

13. The tachometer of claim 10 and further including an erase switch for selectively resetting said counter to 0.

14. The tachometer of claim 10 wherein said circuit means further includes a gate circuit coupled to receive the outputs of said comparator and said clock and coupled to said counter, and responsive to the outputs of said comparator circuit and said clock for gating the clock signal through to the counter when the instantaneous rpm value is one of greater than or lesser than the rpm value currently stored in said counter.

15. The tachometer of claim 10 and further including an energy storage device for maintaining the output of said counter for a predetermined period in the absence of an output voltage of a power supply for normally powering said counter.

16. A tachometer comprising:
a display responsive to an rpm signal for producing an observable indication of an rpm value;
a circuit responsive to an engine input signal for developing an engine rpm signal representative of instantaneous engine rpm;
a peak or valley rpm memory responsive to said engine rpm signal for continuously recording a peak or valley rpm value thereof;
a switching circuit having a first state which selects said engine rpm signal for driving the display and a second state which selects said peak or valley rpm value for driving said display;
wherein said peak rpm memory comprises a counter for retaining a signal corresponding to a peak or valley rpm value, a clock for driving said counter, and a comparator for comparing the content of said counter with said engine rpm signal, and
a gate circuit coupled to receive the outputs of said comparator and said clock and coupled to said counter, and responsive to the outputs of said comparator and said clock for gating the clock signal through to the counter when the instantaneous rpm value is one of greater than or lesser than the rpm value currently stored in said counter.

17. The tachometer of claim 16 wherein said memory device comprises a binary counter.

18. The tachometer of claim 16 and further including an energy storage device for maintaining the output of said counter for a predetermined period in the absence of an output voltage of a power supply for normally powering said counter.

19. The tachometer of claim 16 and further including a differential amplifier circuit having a first input for receiving said engine rpm signal and a second input for receiving an adjustable offset rpm signal corresponding to a selectable rpm value, said differential amplifier circuit being responsive to the signals received at said first and second inputs for developing a differential output signal comprising a difference between the signals received at said first and second inputs amplified by a predetermined gain, and wherein said switching circuit has a further state which selects said amplified rpm signal for driving said display.

20. The tachometer of claim 16 wherein said display comprises an analog meter including a moveable indicator and a plurality of scale markings.

21. The tachometer of claim 20 wherein said scale markings represent first rpm increments in response to said engine rpm signal and second, smaller increments in response to said amplified differential rpm signal.

22. The tachometer of claim 16 and further including a signal adjustment circuit operatively coupled to said second input of said differential amplifier for adjusting the offset rpm signal so as to cause the display to produce an observable indication corresponding to a center value in response to a test signal corresponding to a desired rpm to the first input of said differential amplifier circuit, such that values of said engine rpm signal above and below said desired rpm will cause the display to produce an amplified indication to either side of said center value.

23. A tachometer comprising:
a display which receives an rpm signal and produces an observable indication of an rpm value;
an input circuit which receives an engine input signal and develops an engine rpm; signal representative of instantaneous engine rpm,
a differential amplifier circuit which amplifies the difference between said engine rpm signal and an adjustable offset rpm signal corresponding to a selectable rpm value by a predetermined gain and produces an amplified differential rpm signal; and
a switch circuit having a first state which selects said engine rpm signal for driving the display and a second state which selects said amplified differential rpm signal for driving said display.

24. The tachometer of claim 23 wherein said display comprises an analog meter including a moveable indicator and a plurality of scale markings.

25. The tachometer of claim 23 wherein said differential amplifier circuit has a first input which receives said engine rpm signal and a second input which receives an adjustable offset rpm signal and differentially amplifies the signals received at said first and second inputs for developing a differential output signal comprising a difference between the signals received at said first and second inputs amplified by said predetermined gain.

26. The tachometer of claim 24 wherein said scale markings represent first rpm increments when said engine rpm signal is selected and second, smaller increments when said amplified differential rpm signal is selected.

27. The tachometer of claim 25 and further including a signal adjustment circuit operatively coupled to said second input of said differential amplifier for adjusting the offset rpm signal until the display produces an observable indication corresponding to a center value when a test signal corresponding to a desired rpm is fed to the first input of said differential amplifier circuit.

28. A tachometer in accordance with claim 23 and further including a peak or valley rpm memory which receives said engine rpm signal and continuously records a peak or valley rpm value of said engine rpm signal and said switch circuit having a further state which selects said peak or valley rpm value for driving said display to provide an observable indication of said peak or valley rpm value.

29. The tachometer of claim 28 wherein said peak rpm memory comprises a memory device which retains a signal corresponding to a peak or valley rpm value, a comparator which compares the content of said memory device with said engine rpm signal and a memory control circuit which causes said memory device to retain one of the greater or lesser of an instantaneous content of said memory device and an instantaneous value of the rpm signal.

30. The tachometer of claim 29 wherein said memory device comprises a binary counter.

31. The tachometer of claim 30 wherein said peak or valley rpm memory further includes a resistor network coupled with said counter which converts the digital output count of said counter to an analog value, and a clock which drives said counter.

32. The tachometer of claim 30 wherein said peak or valley rpm memory further comprises a resistor network coupled to said counter and which selects a resistance value corresponding to said output count.

33. The tachometer of claim 30 and further including an erase switch to selectively reset said counter to 0.

34. The tachometer of claim 30 wherein said memory control circuit further includes a gate circuit coupled to receive the outputs of said comparator and said clock and coupled to said counter, and which gates the clock signal through to the counter when the instantaneous rpm value is greater than or less than the rpm value currently stored in said counter.

35. The tachometer of claim 30 and further including an energy storage device which maintains the output of said counter for a predetermined period in the absence of an output voltage of a power supply which normally powers said counter.

36. A tachometer comprising:

a display which receives an rpm signal and produces an observable indication of an rpm value;

an input circuit which receives an engine input signal and develops an engine rpm signal representative of instantaneous engine rpm;

a peak or valley rpm memory which receives said rpm signal and continuously recording a peak or valley rpm value thereof;

a switching circuit having a first state which selects said engine rpm signal for driving the display and a second state which selects said peak or valley rpm value for driving said display;

wherein said peak or valley rpm memory comprises a counter which retains a signal corresponding to a peak or valley rpm value, a clock which drives said counter, and a comparator which compares the content of said counter with said rpm signal; and a gate circuit coupled to receive the outputs of said comparator and said clock and coupled to said counter, and which gates the clock signal through to the counter when the instantaneous rpm value is greater than or less than the rpm value currently stored in said counter.

37. The tachometer of claim 36 wherein said memory device comprises a binary counter.

38. The tachometer of claim 36 and further including an energy storage device which maintains the output of said counter for a predetermined period in the absence of an output voltage of a power supply which normally powers said counter.

39. A method of operating a tachometer in a normal mode and in a power band mode comprising the steps of:

developing an engine rpm signal representative of instantaneous engine rpm;

amplifying the difference between said engine rpm signal and an adjustable offset rpm signal corresponding to a selectable rpm value by a predetermined gain to produce an amplified differential rpm signal; and producing observable indications of said engine rpm signal and of said amplified differential rpm signal.

40. The method of claim 39 wherein the step of producing an observable indication includes providing a meter having scale markings which represent first rpm increments for said engine rpm signal and second, smaller increments for said amplified differential rpm signal.

41. The method of claim 40 and further including adjusting the offset rpm signal to produce an observable indication corresponding to a center value on said meter while a test signal corresponding to a desired rpm is substituted for said engine rpm signal.

42. The method of claim 39 and further including continuously recording a peak or valley rpm value, and producing an observable indication of said peak or valley rpm value.

43. The method of claim 42 wherein recording a peak or valley rpm value comprises retaining in a memory device a signal corresponding to a peak or valley rpm value, comparing the content of said memory with said engine rpm signal, and causing said memory device to retain one of the greater or lesser of an instantaneous content of said memory device and an instantaneous value of the engine rpm signal.

44. The method of claim 43 and further including maintaining the contents of said memory device for a predetermined period in the absence of an output voltage of a power supply for normally powering said memory device.

45. The tachometer of claim 8 and further including a second differential amplifier circuit for amplifying the difference between said peak or valley rpm signal and an adjustable offset signal to produce an amplified differential peak or valley signal, said switching circuit having a further state which selects said amplified differential peak or valley signal for driving said display.

46. The tachometer of claim 19 and further including a second differential amplifier circuit for amplifying the difference between said peak or valley rpm signal and an adjustable offset signal to produce an amplified differential peak or valley signal, said switching circuit having a further state which selects said amplified differential peak or valley signal for driving said display.

47. The tachometer of claim 28 and further including a second differential amplifier circuit for amplifying the difference between said peak or valley rpm signal and an adjustable offset signal to produce an amplified differential peak or valley signal, said switching circuit having a further state which selects said amplified differential peak or valley signal for driving said display.

48. The method of claim 42 and further including differentially amplifying said peak or valley signal and producing an observable indication of differentially amplified peak or valley signal.

49. The tachometer of claim 19 wherein said switching circuit further includes a state which substitutes said peak or valley signal for said engine input signal at said differential amplifier circuit and a state which selects said peak or valley rpm signal for driving said display and a state which selects an amplified differential peak or valley signal for driving said display.

50. The tachometer of claim 25 wherein said switching circuit further includes a state which substitutes said peak or valley signal for said engine input signal at said differential amplifier circuit and a state which selects said peak or valley rpm signal for driving said display and a state which selects an amplified differential peak or valley signal for driving said display.

* * * * *